United States Patent [19]

Barksdale

[11] 4,236,461

[45] Dec. 2, 1980

[54] REMOVABLE AND FOLDABLE VEHICLE TABLE

[76] Inventor: Lester T. Barksdale, P.O. Box 856, Lake Panasoffkee, Fla. 33538

[21] Appl. No.: 18,444

[22] Filed: Mar. 7, 1979

[51] Int. Cl.³ .............................................. A47B 23/00
[52] U.S. Cl. ......................................... 108/44; 5/119
[58] Field of Search ............... 5/94, 118, 119; 108/44, 108/94, 139, 142, 79, 69, 77, 65

[56] References Cited

U.S. PATENT DOCUMENTS

| | | | |
|---|---|---|---|
| 937,639 | 10/1909 | Paulsen | 108/69 |
| 1,406,116 | 2/1922 | Viles | 108/69 X |
| 1,743,332 | 1/1930 | Ellsworth | 5/119 X |
| 2,214,575 | 9/1940 | Cercownay | 108/44 X |
| 2,258,782 | 10/1941 | McKean | 108/77 X |
| 3,003,786 | 10/1961 | Liston | 108/44 X |
| 3,012,679 | 12/1961 | Richter | 108/139 |
| 3,912,324 | 10/1975 | Troyer | 108/44 X |

FOREIGN PATENT DOCUMENTS

| | | | |
|---|---|---|---|
| 822853 | 1/1938 | France | 5/119 |
| 1555210 | 1/1969 | France | 108/44 |

Primary Examiner—Roy D. Frazier
Assistant Examiner—Peter A. Aschenbrenner
Attorney, Agent, or Firm—Duckworth, Hobby, Allen & Pettis

[57] ABSTRACT

A foldable and removable table for use with vehicles of the type having a hinged panel permitting entry into the vehicle includes a corner table member having a flat supporting surface and a pair of hooks, each hook removably engaging the vehicle panel in a corresponding hole, each hook being coupled with the table member at spaced corners thereof. The table includes a leg foldably fastened to the table member on a side opposite the supporting surface foldable to a storage position flush with that side. The hooks are dimensioned such that rotation of the table member about one corner and one hook permits the table to be moved from a storage position flush with the panel to an open position for use as a table.

8 Claims, 4 Drawing Figures

REMOVABLE AND FOLDABLE VEHICLE TABLE

BACKGROUND OF THE INVENTION

1. Field of the Invention

The present invention relates to vehicle accessories, and in particular relates to foldable and portable tables which are adapted for use with vehicles of the type having a hinged panel permitting entry into the vehicle, such as the tail gate of a pick-up truck or the vertical door of a van.

2. Description of the Prior Art

In recent years, there has been a significant increase in the use of pick-up trucks, vans and other utility vehicles for personal recreational use. Accordingly, there have been devised various techniques for fitting these vehicles with supports which are useful as picnic tables and the like. Generally, however, prior art techniques for fitting these vehicles with table supports have generally relied on fasteners, such as sheet metal screws and machine bolts, which are of a permanent nature. Thus, prior art arrangements for providing table fixtures for such vehicles have not heretofore provided for easy removal, and makes it difficult to convert the vehicle from recreational uses to more utilitarian uses.

Prior art United States Patents of interest include the following: U.S. Pat. Nos. 1,477,812 to Crockett; 2,207,667 to Holley; 1,403,317 to Gross; and 2,100,261 to Montgomery.

SUMMARY OF THE INVENTION

The present invention contemplates a foldable and removable table for use with vehicles of the type having a hinged panel permitting entry into the vehicle, the table including a cornered table member having a flat supporting surface and a pair of hooks, each hook adapted to removably engage the vehicle panel in a corresponding hole therein with each hook being coupled with the table member at spaced corners thereof. Means are provided for permitting rotation of the table about one of the corners, and the table is further provided with at least one leg foldably fastened to the table member on a side opposite the supporting surface and foldable to a storage position flush with that side. Fastening means are included for holding the table member in a storage position parallel with the vehicle panel, the entire table arrangement being adapted such that rotation of the table member about one corner permits the table to be moved from its storage position flush with the panel to an open position for use as a table.

In accordance with a first embodiment of the present invention, the hook opposite the corner of rotation is dimensioned so as to engage a third hole in the vehicle panel when the table member is rotated to the open position, both hooks being comprised of a rod extending away from the table member and curving in a direction substantially parallel to the plane of the supporting surface, both hooks engaging the table member on the opposite side.

In accordance with a second embodiment of the present invention, the table member includes a support plate coupled with the hooks, and the table member being rotatably coupled with the support plate. The table is rotatably pivoted by a pin coupled to the table member and the support plate, such that the table member-support plate combination can be rotated away from the vehicle panel, and then the table member may be rotated about the pivot pin at one corner, in a plan substantially normal to the plane of the vehicle panel. In this second embodiment, each hook comprises a rod coupled to the support plate and extending parallel with the support plate and curving in a direction substantially normal to the support plate.

THE DRAWING

DETAILED DESCRIPTION

A first embodiment of the present invention will now be described with reference to FIGS. 1 and 2.

Figure 1:
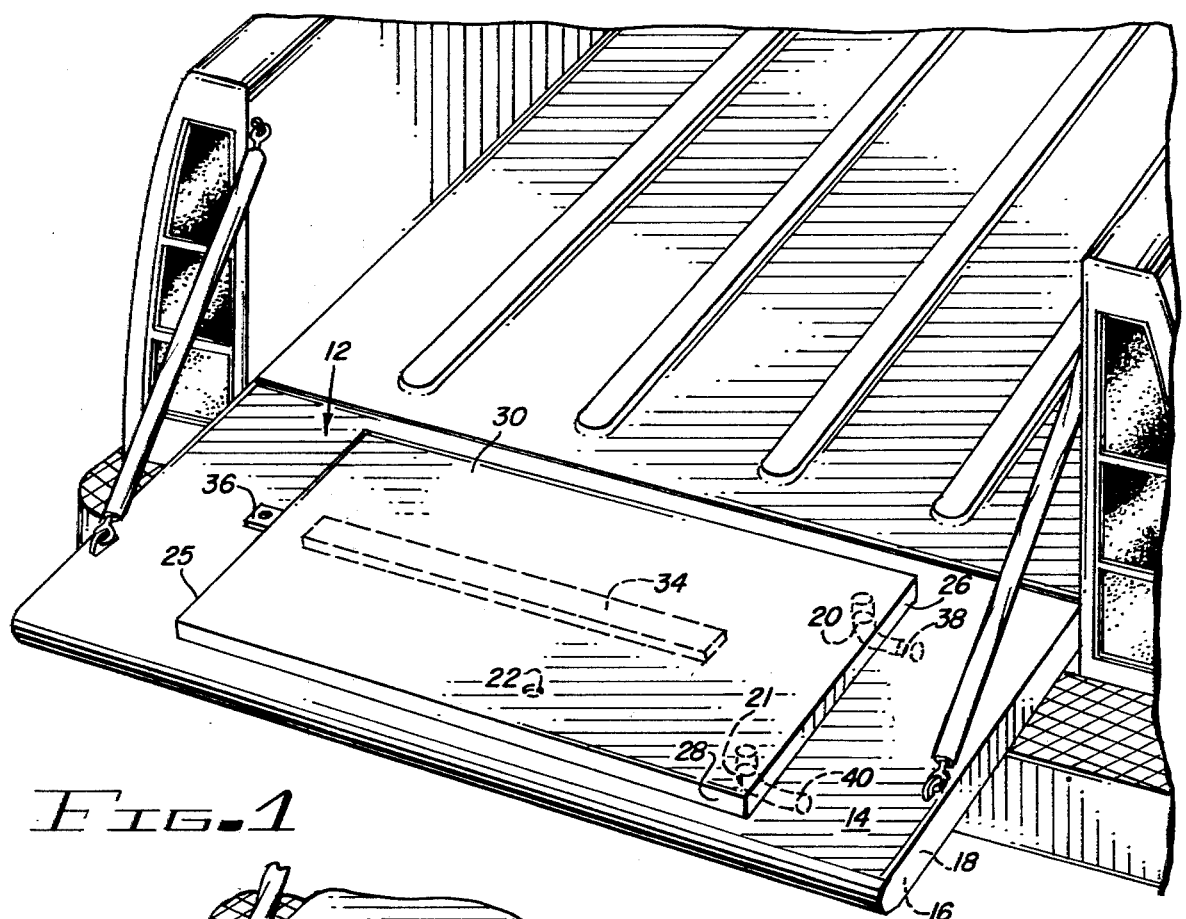
FIG. 1 is a perspective view illustrating the first embodiment of the present invention, with the table member shown in the stored position.
Figure 2:
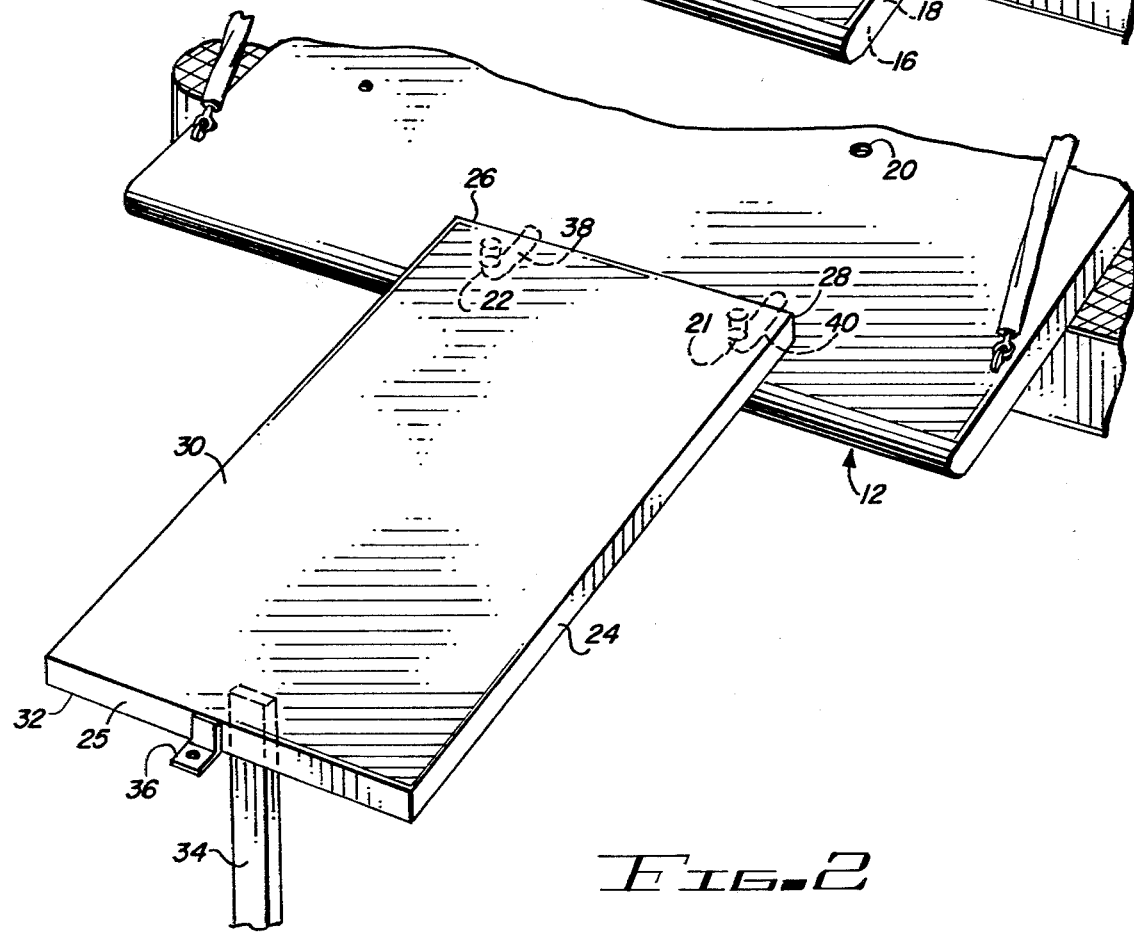
FIG. 2 is a perspective view illustrating the first embodiment of the present invention, with the table member shown rotated to the open position.

The embodiment of FIGS. 1 and 2 is adapted for use with a vehicle, such as a pick-up truck, having a tail gate 12 formed of opposing metal plates 14, 16 defining a hollow interior 18 therein. The top panel 14 of the tail gate 12 is provided with three holes 20, 21 and 22 to permit engagement by a pair of curved hooks 38, 40, in a manner which is described in greater detail below.

The arrangement of FIGS. 1 and 2 is provided with a table member 24, such as for example, a sheet of plywood or the like. The table member 24 includes opposing corners 26, 28 which are disposed in the manner shown in FIG. 1. The table member 24 further includes a supporting upper surface 30 which is preferably flat to serve as a conventional table surface. The table member 24 further includes an opposing side 32 against which a leg 34 is rotatably mounted in a storage position. The table member 24 is provided with a snap 36 at the opposing end 25 is order to hold the table member 24 in the storage position.

As noted previously, the embodiment shown in FIGS. 1 and 2 is provided with a pair of hooks, 38, 40 which are coupled to the opposing side 32 of the table member 24 and engage the tail gate 12 within the hollow interior 18. To this end, each hook 38, 40 is formed of a rod extending away from the opposing side 32 of the table member 24 and curving in a direction substantially parallel to the plane of the supporting surface 30. The manner in which the hooks 38, 40 engage the tail gate 12 is essentially identical to the arrangement shown in my co-pending U.S. patent application Ser. No. 911,336, filed on June 1, 1978.

In use, the table member 24 is maintained in the storage position as shown in FIG. 1, with the leg 34 rotated against the opposing side 32 in the storage position. The snap 36 is fastened in a conventional manner to the tail gate 12, to hold the table member 24 in the storage position.

To rotate the table member 24 to the open position as shown in FIG. 2, the table member 24 is rotated away from the tail gate 12 about an imaginary line between the corners 26, 28, until such time as the innermost rod 38 is free of the corresponding hole 20 in the tail gate panel 14. Thereafter, the table member 24 is tilted slightly toward the corner 28, causing the hook 38 to disengage from the tail gate 12, permitting the entire table member 24 to be rotated about the corner 28 until the hook 38 is positioned near the third hole 22 in the tail gate 12. Then the hook 38 is engaged in the hole 22, and the table member 24 is again rotated, this time downward, about the imaginary line between the corners 26 and 28 until such time as the support surface 30 is substantially parallel with the upper panel 14 of the tail gate 12. The leg 34 is then rotated into position, and the table member 24 is in the open, or out position.

A second embodiment of the present invention will now be described with reference to FIGS. 3 and 4.

Figure 3:
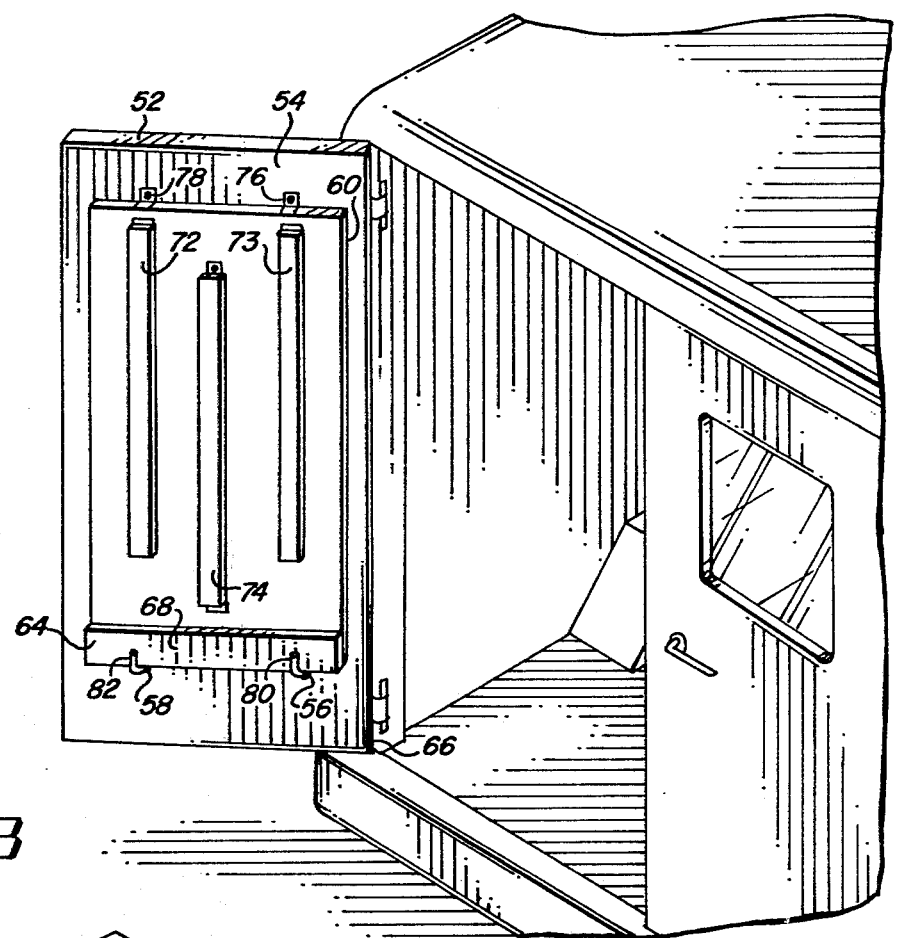
FIG. 3 is a perspective view illustrating a second embodiment of the present invention, in which the table member is shown in the stored position.
Figure 4:
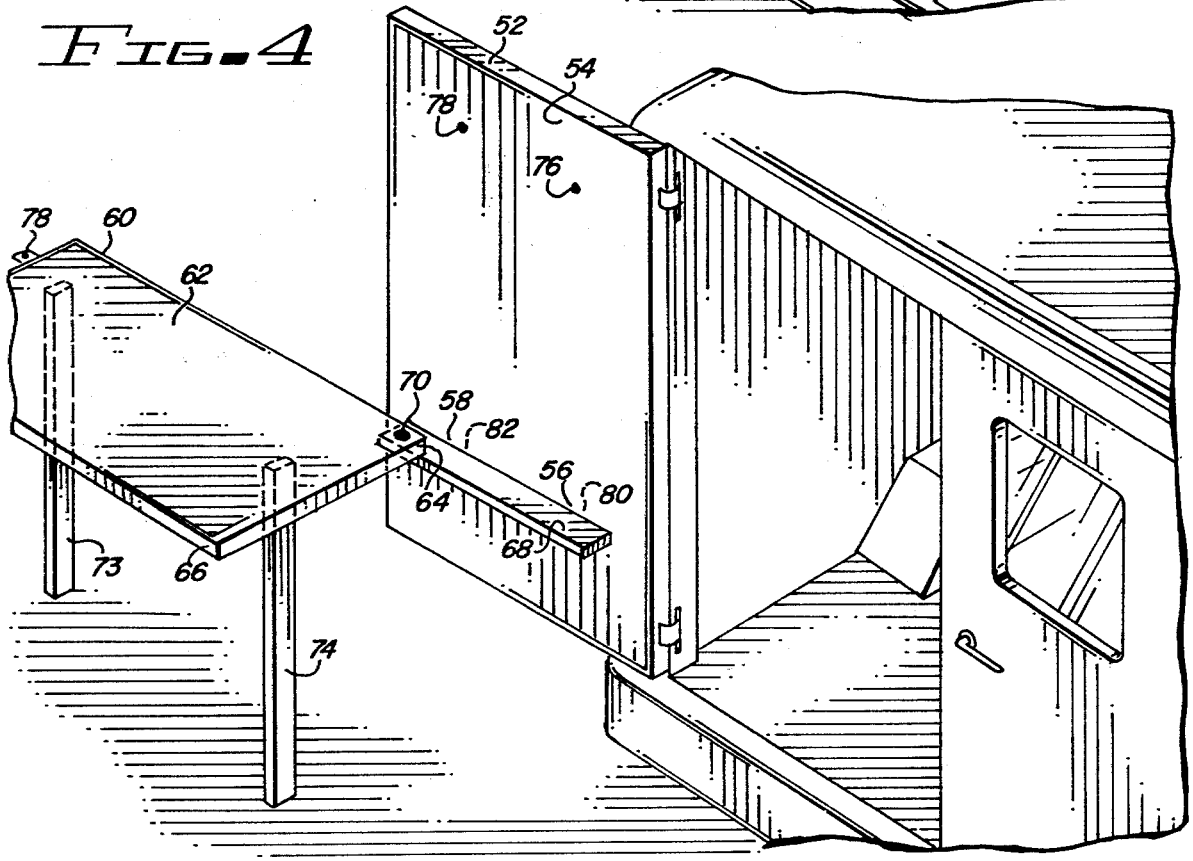
FIG. 4 is a perspective view illustrating the second embodiment of the present invention, with the table member rotated to the open position.

The embodiment of FIGS. 3 and 4 is adapted for use with a van of the type having a vertical side or rear door such as the door 52 depicted in FIGS. 3 and 4.

Conventionally, the van door 52 includes an inner surface 54 which defines a hollow interior, in a manner similar to that described above with respect to the tail gate embodiment shown in FIGS. 1 and 2. The door 52 is likewise provided with holes 56, 58 extending through the inner surface 54, permitting curved hooks 80 and 82 to engage the inner surface 54 in the manner which is described in greater detail below.

As shown in FIG. 3, the arrangement there disclosed includes a table member 60 having a supporting surface 62 (note FIG. 2) and opposing corners 64, 66.

The arrangement in FIGS. 3 and 4 includes a support plate 68 mounted parallel with the table member 60 and to which are joined the hooks 80, 82. The table member 60 is pivotably joined to the support plate 68 by a pivot pin 70 mounted at the corner 64 of the table member 60. The arrangement is further provided with three legs 72, 73 and 74 which are rotatably fastened to the underside of the table member 60. Snaps 76 and 78 provide a similar function as the snap 36 in FIGS. 1 and 2, to hold the table member 60 in the closed position against the inside surface 54 of the van door 52.

As was described above with respect to FIGS. 1 and 2 and my previous patent application, the hooks 80, 82 shown in FIGS. 3 and 4 likewise comprise curved rods; however, in the case of the rods shown in FIGS. 3 and 4, the rods are coupled to the support plate 68 and extend parallel with the support plate and curve in a direction substantially normal to the support plate and the supporting surface 62 of the table member 60.

In use, the table member 60 is fastened against the inside surface 54 of the van door 52, until such time as a need for the table member 60 arises. Then, the snaps are unfastened from the inside surface 54, the table member 60 is rotated about an imaginary line between the two corners 64 and 66 downward away from the inner surface 54, until such time as the table member 60 is substantially horizontal. The table member 60 is then rotated about the pivot pin 70 to thereafter extend the table member away from the van door 52; alternatively, the table member 60 may be permitted to continue to rest against the support plate 68. Of course, the legs 72, 73 and 74 are rotated downward to support the table member in the desired manner.

I claim:

1. A foldable and removable table for use with vehicles of the type having a hinged panel permitting entry into the vehicle, said table comprising:
    a cornered table member having a flat supporting surface;
    a pair of hooks, each hook adapted to removably engage said vehicle panel in a corresponding hole therein, each hook being coupled with said table member at spaced corners thereof;
    means, including one of said hooks, for permitting rotation of said table about one of said corners;
    a leg foldably fastened to said table member on a side opposite said supporting surface and foldable to a storage position flush with said side;
    fastening means for holding said table member in a storage position parallel with said vehicle panel and with said opposite side adjacent said panel; wherein
    rotation of said table member about said one corner and one of said hooks permits said table to be moved from a storage position flush with said panel to an open position for use as a table; and wherein
    the other of said hooks is dimensioned so as to engage a third hole in said vehicle panel when said table member is rotated to said open position.

2. The foldable and removable table as recited in claim 1 wherein said leg is positioned between said opposite side and said panel while in said storage position.

3. A foldable and removable table as recited in claim 2 wherein each said hook comprises a rod extending away from said table member and curving in a direction substantially parallel to the plane of said supporting surface.

4. A foldable and removable table for use with vehicles of the type having a hinged panel permitting entry into the vehicle, said table comprising:
    a support plate;
    a cornered table member having a flat supporting surface, said table member being rotatably coupled with said support plate at one corner of said table member;
    a pair of hooks, each hook adapted to removably engage said vehicle panel and a corresponding hole therein, each hook being coupled with said table member at spaced corners thereof;
    means, including one of said hooks, for permitting rotation of said table about one of said corners;
    at least one leg foldably fastened to said table member on a side opposite said supporting surface and foldable to a storage position flush with said opposite side;
    fastening means for holding said table member in a storage position parallel with said vehicle panel, and with said supporting side against said panel; and wherein
    rotation of said support plate about said hooks permits said table to be moved from a storage position flush with said panel to an open position for use as a table, and wherein said said table may be further rotated about said one corner thereof to a different, open position.

5. A foldable and removable table as recited in claim 4 further comprising a pivot pin rotatably coupling said table member to said supporting plate.

6. A foldable and removable table as recited in claim 5 wherein said pivot pin is coupled with said table member at one corner of said support surface.

7. A foldable and removable table as recited in claim 6 wherein each said hook comprises a rod coupled to said support plate and extending parallel with said support plate and curving in a direction substantially normal to said support plate.

8. A foldable and removable table for use with vehicles of the type having a hinged panel permitting entry into the vehicle, said table comprising:
- a cornered table member having a flat supporting surface;
- a pair of hooks, each hook adapted to removably engage said vehicle panel in a corresponding hole therein, each hook being coupled with said table member at spaced corners thereof;
- means, including one of said hooks, for permitting rotation of said table about one of said corners;
- fastening means for holding said table member in a storage position parallel with said vehicle panel and with said opposite side adjacent said panel; wherein
- rotation of said table member about said one corner and one of said hooks permits said table to be moved from a storage position flush with said panel to an open position for use as a table; and wherein
- the other of said hooks is dimensioned so as to engage a third hole in said vehicle panel when said table member is rotated to said open position.

* * * * *